United States Patent [19]

Rumbaugh

[11] Patent Number: 4,635,406

[45] Date of Patent: Jan. 13, 1987

[54] APPARATUS FOR STRIPPING FISH LINE FROM A SPOOL AND SHARPENING FISH HOOKS

[75] Inventor: James T. Rumbaugh, Spirit Lake, Iowa

[73] Assignee: Berkley and Company, Inc., Spirit Lake, Iowa

[21] Appl. No.: 655,569

[22] Filed: Sep. 28, 1984

[51] Int. Cl.⁴ .................. B24B 23/02; B65H 20/02
[52] U.S. Cl. ............................ 51/181 R; 76/85;
7/106; 7/170; 226/102; 226/187
[58] Field of Search ............... 51/72 R, 109 R, 206 R,
51/209 R, 181 R, 170 PT, 170 T; 76/85; 7/106,
170; 254/287; 226/102, 181, 182, 187, 190

[56] References Cited

U.S. PATENT DOCUMENTS

| | | | |
|---|---|---|---|
| 2,255,541 | 9/1941 | Dremel | 51/72 R X |
| 2,655,725 | 10/1953 | Fehrman | 51/170 PT X |
| 2,796,705 | 6/1957 | Miller et al. | 51/206 R |
| 3,169,536 | 2/1965 | Caracciolo | 51/170 PT |
| 3,406,888 | 10/1968 | Ramey | 226/187 |
| 3,468,068 | 9/1969 | Spruell | 51/205 R X |
| 3,718,938 | 3/1973 | Blume | 51/181 X |
| 4,265,056 | 5/1981 | Yamamoto | 51/181 R X |

Primary Examiner—Robert P. Olszewski
Attorney, Agent, or Firm—Faegre & Benson

[57] ABSTRACT

A portable hand-held apparatus for sharpening fish hooks and stripping lines from a fish spool. The apparatus includes a housing having an inlet port, an exit port and an aperture through which a sharpening mechanism extends. A motor mechanism is mounted within the housing operatively connected to a roller mechanism and the sharpening mechanism. The roller mechanism is aligned with the inlet and exit ports and is arranged to engage the free end of a line, guided through the housing inlet port. The roller mechanism transports the line through the housing and out the exit port, stripping the line off the spool. A sharpening mechanism rotatably projects through the housing aperture to engage a fish hook barb or other object.

8 Claims, 7 Drawing Figures

U.S. Patent    Jan. 13, 1987    4,635,406
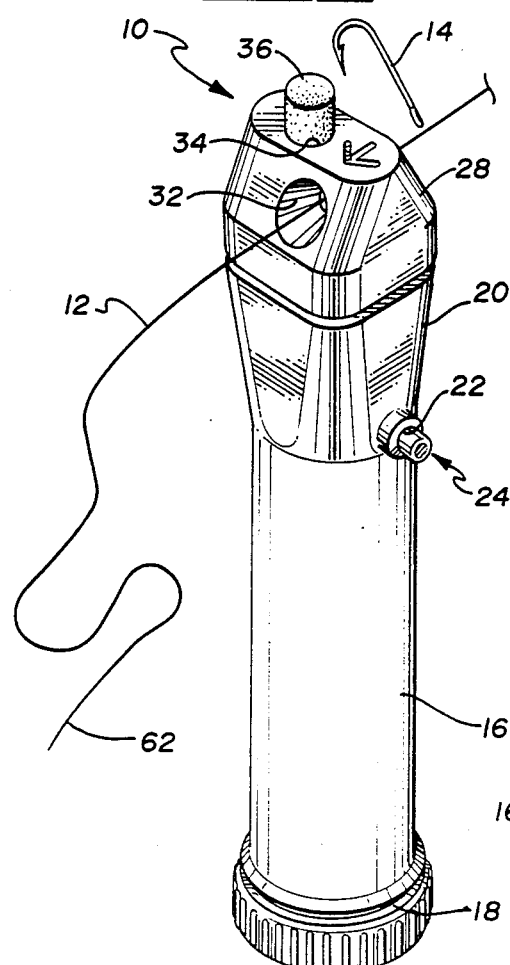
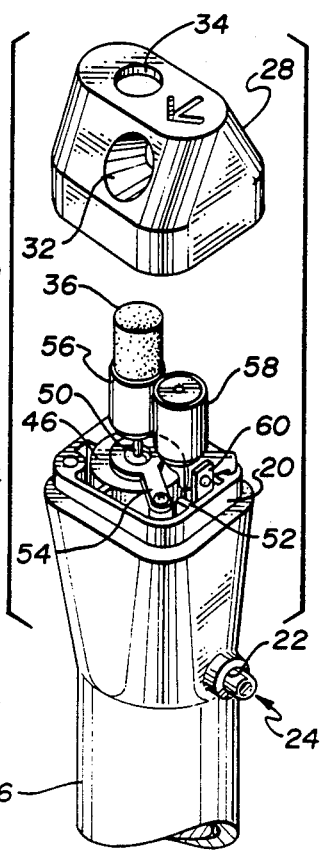
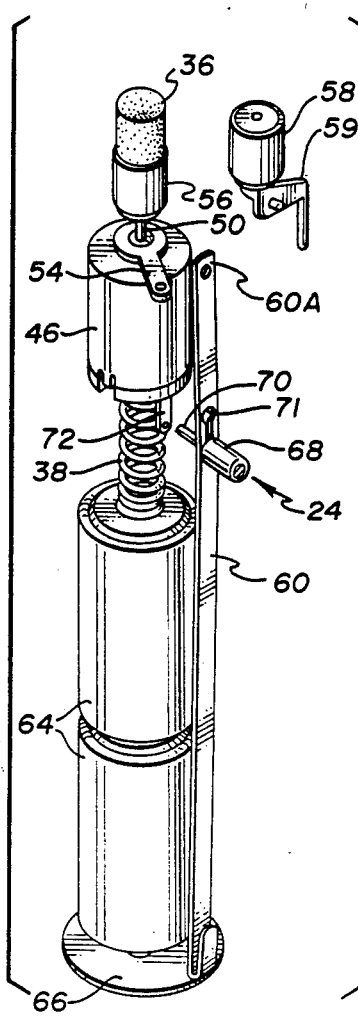
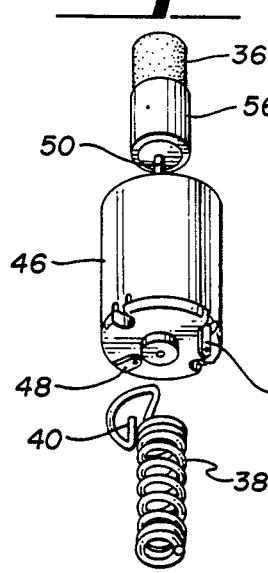
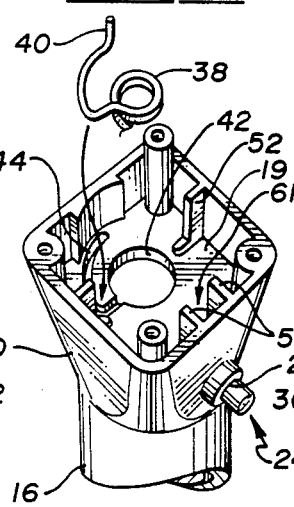
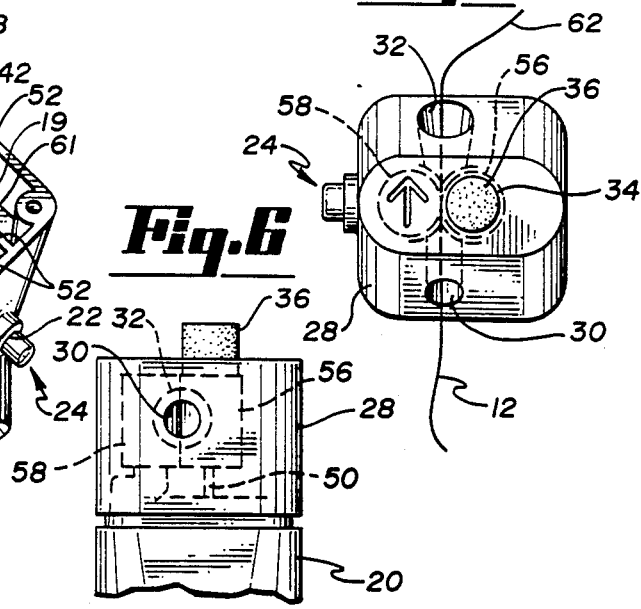

4,635,406

1

APPARATUS FOR STRIPPING FISH LINE FROM A SPOOL AND SHARPENING FISH HOOKS

BACKGROUND OF THE INVENTION

1. Field of the Invention

The present invention relates generally to apparatus used to strip line from a spool and to sharpen the point of a fish hook.

2. Description of the Prior Art

Several types of line dispensing apparatus have been employed in the past utilizing friction wheels or rollers between which fish line is fed, to control backlash of the fish line during casting and/or to increase the length of the cast. None of these devices have been suitable for use as self-contained portable line strippers and none have been adaptable for use as sharpening devices.

SUMMARY OF THE INVENTION

The present invention includes apparatus useful for stripping a line from a spool and dressing the point of a fish hook. The apparatus includes a housing provided with an inlet port and an exit port through which the line to be stripped from a spool is drawn, and an aperture through which a sharpening member projects. A motor mechanism is disposed within the housing, operatively connected to a roller mechanism aligned with the inlet and exit ports. The roller mechanism is arranged to engage and transport the free end of a line inserted into the inlet port through the housing and out the exit port, thereby stripping the line from the spool.

A sharpening element is rotatably mounted to the motor means and externally projects through the housing aperture.

BRIEF DESCRIPTION OF THE DRAWINGS

FIG. 1 is a perspective view illustrating the line stripper and hook sharpener of the present invention drawing a line from a spool (not shown) and also showing a fishing hook disposed in position to be sharpened;

FIG. 2 is a perspective detail of an upper end portion of the present invention, a cover member being separated from the upper end to expose to view some of the internal operative elements of the present invention;

FIG. 3 is a perspective view of some of the internal elements of the present invention;

FIG. 4 is a perspective view of a motor, a drive roller and sharpening slug mounted on the shaft of the motor, and a coil or contact spring aligned with one of the motor's electric leads, said members comprising a portion of the internal elements of the present invention;

FIG. 5 is a perspective view of the upper end or head portion of a housing of the present invention with all the internal parts removed, and one end of the contact spring suspended above a groove in the housing head in which it is normally seated;

FIG. 6 is a front elevational view of the upper end portion of the present invention, illustrating the alignment of the roller mechanism of the present invention with an inlet port through the cover member; and FIG. 7 is a top plan view of the line stripper and hook sharpener of the present invention.

DETAILED DESCRIPTION OF THE PREFERRED EMBODIMENTS

A line stripping and fish hook dressing apparatus 10 of the present invention is shown in use in FIG. 1, illustrating the stripping of a line 12 from a spool (not shown) and also showing a fish hook 14 in position to be sharpened.

Line stripper 10 is of such size as to be hand held and includes an insulative hollow housing 16, serving as a handle, which insulates and protects the internal elements of the present invention. Housing 16 is a substantially cylindrical member having an externally threaded first end 18 which is removably closed by a cap member 26 having internal screw threads dimensioned to mate with the external housing threads.

A partioning wall 19 transversely divides the body housing 16 from an upper portion 20 which is molded for receiving and mounting the operative elements of the line stripper 10. Wall 19 separates the operative elements from the batteries which are retained within the housing. The wall of housing 16 further includes an aperture 22 for receiving an actuating buttom 24 positioned for actuation by the thumb or finger of a user holding the stripper.

A decorative and protective cover 28 constructed of dielectric material removably closes the upper portion 20 of housing 16. Cover 28 includes a first aperture 30 of circular cross section, serving as an inlet port for the free end of a line to be stripped from a spool. Oppositely and substantially horizontally disposed from first aperture 30 is a larger second aperture 32, having a frusto-conical periphery tapering axially inward. Aperture 32 serves as an exit port for a line drawn through inlet port 30. Cover 28 further includes an aperture 34 through the top thereof, through which a sharpening element or slug 36 extends when cover 28 is in place.

Mounted within housing 16 is a coil or contact spring 38. A first end 40 of contact spring 38 extends through an aperture 42 in wall 19 and is supportably held in position by a suitable recess 44, as illustrated in FIG. 5. A motor 46 having a first electrical terminal 48 and a shaft 50 is further disposed within upper portion 20 such that free end 40 of contact spring 38 is fixed in mating engagement with first terminal 48 as indicated in FIG. 4. As shown in FIG. 2, motor 46 is fixed in position within head 20 by means of support ribs 52, integrally molded as part of head 20 a shown in FIG. 7, and a support arm 54. Support arm 54 is fixed to head 20 and motor 46 in a manner which does not interfere with the rotation of shaft 50. Motor 46 is further oriented so that shaft 50 rotates about a substantially vertical axis.

Axially coupled to shaft 50 of motor 46 are a cylindrical drive roller 56 and cylindrical ceramic sharpening slug 36. As shown in FIG. 2, slug 36 is axially aligned with aperture 34 in cover 28. When cover 28 is attached to housing 16, slug 16 rotatably extends through the aperture 34 for engaging an object to be dressed or sharpened.

A cylindrical idler roller 58 is rotatably mounted on pivot arm 59. Pivot arm 59 is pivotally mounted within head 20 so that the axis of rotation of idler roller 58 is parallel to the rotational axis of drive roller 56. Idler roller 58 is operatively biased into frictional engagement with drive roller 56 by a leaf spring 60 for rotation with drive roller 56. When slightly bowed leaf spring 60 is disposed within housing 16, spring 60 contacts the wall of housing 16 intermediate its longitudinal ends, and its ends will project inward. Upper end 60A of spring 60 extends through a recess 61 in wall 19 and engages pivot arm 59. Spring 60 biases idler roller, via arm 59, into continuous frictional engagement with drive roller 56. Leaf spring 60 is constructed of electrically conductive material for reasons which will become apparent later.

The tangent line of contact between drive roller 56 and idler roller 58 lies along the path between inlet port 30 and exit port 32. When a free end 62 of line 12 is inserted into inlet port 30, it is drawn between the drive roller 56 and idler roller 58 and transported to and out exit port 32. The transport of line 12 through the line stripper takes place along the substantially straight line path shown in FIG. 7.

Power for motor 46 is provided by batteries 64. By using a battery powered energy supply, the present invention becomes readily portable and rechargeable, as well as light weight and of compact size. Batteries 64 are replaceably positioned within housing 16 by first removing cap 26 from the bottom 18 of the housing, and then inserting batteries 64 within housing 16. When cap 26 is replaced, contact spring 38 is compressed between motor 46 and the batteries, assuring continuous electrical contact between motor terminal 48 and batteries 64. Cap 26 further includes an electrically conductive washer or plate member 66, disposed at the closed end of cap 26. Washer 66 serves to electrically connect batteries 64 with electrically conductive leaf spring 60, when cap 26 is threaded onto housing 16 as shown in FIG. 1.

Actuator button 24, having an insulating cap 68 and an electrically conductive shaft 70 within cap 68, is arranged to complete the electrical circuit between batteries 64 and motor 46. Button 24 is mounted on leaf spring 60 through an aperture 71 so that shaft 70 is in continuous electrical contact with leaf spring 60. Rod 70 is also axially aligned with electric lead 72 of motor 46. Leaf spring 60, which biases idler roller 58 into engagement with drive roller 56, also biases button 24, and particularly electrically conductive shaft 70, away from motor lead 72, creating an open circuit. Upon depression of button 24 with sufficient force to overcome the opposing bias of leaf spring 60, conductive shaft 70 is pressed into physical and electrical engagement with lead 72. This contact completes or closes the circuit between lead 48 of motor 46 through contact spring 38, batteries 64, plate 66, leaf spring 50 and shaft 70 of actuator button 24, to lead 72 of motor 46, thereby driving motor 46.

In operation, the free end 62 of line 12, is inserted into inlet port 30, and motor 46 is then actuated by depression of actuator button 24. Line 12 is drawn between drive roller 56 and idler roller 58 and transported to and through exit port 32. The present invention will continue to draw the line off of a spool as long as actuator button 24 is depressed. In this manner, the length of the line drawn from the spool may be controlled by the operator. The geometry of the head portion of the stripper resists any tendency of the line to initially feed around drive roller 56 or idler 58.

In the same manner, depression of actuator button 24 will actuate rotation of slug 36 mounted atop drive roller 56. The object to be sharpened or dressed is then properly oriented and pressed into engagement with the rotating slug 36, to precisely sharpen a selected portion or all of the object. Although the present invention is specifically designed to sharpen or dress the point of a fish hook, it can readily be used to sharpen knives, scissors and other related items.

It will also be apparent to those skilled in the art that a number of other modifications and changes can be made without departing from the spirit and scope of the present invention. Therefore, it is to be understood that the invention is not to be limited except by the claims which follow.

I claim:

1. A line stripper for removing line from a spool, comprising:
   housing means provided with an inlet port and an exit port;
   motor means disposed within the housing means;
   drive roller means disposed within the housing means and operatively coupled for rotation by the motor means;
   idler roller means pivotally mounted within the housing means on an axis parallel to the rotational axis of the drive roller means and operatively biased into engagement with the drive roller means for combined rotation therewith; and wherein the drive roller means and idler roller means are aligned with the inlet and exit ports for engaging and transporting the free end of a line inserted into the inlet port, between the rollers and out the exit port;
   said inlet port and said exit port each respectively extending to close proximity to said drive roller and said idler roller with the ends of said inlet and exit ports respectively forming surfaces tangential to said drive roller and idler roller;
   an aperture through the housing means for receiving a sharpening means;
   sharpening means operatively connected to the motor means within the housing means; and wherein:
   the sharpening means is axially aligned with and projects through the housing means aperture.

2. An apparatus for removing line from a spool and for dressing the point of a fish hook, comprising:
   housing means provided with an inlet port and an exit port, and an aperture for receiving a sharpening means;
   motor means disposed within the housing means;
   roller means mounted within the housing means operatively connected to the motor means, and aligned with the inlet and exit ports for engaging and transporting the free end of a line inserted into the inlet port, through the housing means and out the exit port; and
   sharpening means operatively connected to the motor means, axially aligned with and externally projecting through the housing means aperture.

3. The apparatus of claim 2, wherein the roller means comprises a drive roller means rotated by the motor means and an idler roller means pivotally mounted on an axis parallel to the rotational axis of the drive roller means and operatively biased into engagement with the drive roller means for combined rotation therewith.

4. The apparatus of claim 3, wherein the idler roller means is biased into operational engagement with the drive roller means by spring means.

5. The appartaus of claim 2, wherein the sharpening means is a cylindrical ceramic slug.

6. The apparatus of claim 2, wherein the housing means is provided with horizontally opposed inlet and exit ports.

7. The apparatus of claim 3, wherein the drive roller is rotated about a vertical axis.

8. The apparatus of claim 3, wherein the sharpening means is axially mounted on the drive roller.

* * * * *